(12) United States Patent
Fish et al.

(10) Patent No.: US 8,692,912 B2
(45) Date of Patent: Apr. 8, 2014

(54) MULTI-SPECTRAL CAMERA

(75) Inventors: David E. Fish, Littleton, CO (US);
Jason M. Eichenholz, Orlando, FL (US)

(73) Assignee: Pixelteq, Inc., Largo, FL (US)

( * ) Notice: Subject to any disclaimer, the term of this patent is extended or adjusted under 35 U.S.C. 154(b) by 166 days.

(21) Appl. No.: 12/930,800

(22) Filed: Jan. 18, 2011

(65) Prior Publication Data
US 2011/0181757 A1    Jul. 28, 2011

Related U.S. Application Data

(60) Provisional application No. 61/336,651, filed on Jan. 25, 2010.

(51) Int. Cl.
*H04N 7/18* (2006.01)
*H04N 9/083* (2006.01)
*A61B 1/06* (2006.01)
*G06K 9/40* (2006.01)

(52) U.S. Cl.
USPC ............ 348/270; 348/45; 348/65; 348/273; 348/269; 356/419; 356/139.09; 600/181; 600/476; 382/260; 382/261; 358/512

(58) Field of Classification Search
CPC ......... H04N 9/083; H04N 7/18; G01N 31/25; G01N 21/41; G06K 9/40
USPC ............ 348/273, 268–271, 45, 65, 208.99, 348/208.4; 396/241, 544; 356/416, 418, 356/417, 419, 139.09, 155, 156; 600/181, 600/476; 358/512; 382/260, 261; 359/491.01
See application file for complete search history.

(56) References Cited

U.S. PATENT DOCUMENTS

| | | | | |
|---|---|---|---|---|
| 4,878,109 A * | 10/1989 | Hillis | .............................. | 348/271 |
| 4,967,264 A * | 10/1990 | Parulski et al. | ................ | 348/271 |
| 5,202,767 A * | 4/1993 | Dozier et al. | .................. | 348/273 |
| 5,910,816 A * | 6/1999 | Fontenot et al. | ................. | 348/65 |
| 5,943,129 A * | 8/1999 | Hoyt et al. | ...................... | 356/318 |
| 6,236,881 B1 * | 5/2001 | Zahler et al. | ................... | 600/476 |
| 6,766,184 B2 * | 7/2004 | Utzinger et al. | .............. | 600/407 |
| 2003/0229270 A1 * | 12/2003 | Suzuki et al. | ................. | 600/178 |
| 2009/0278945 A1 * | 11/2009 | Lin | .............................. | 348/208.1 |

* cited by examiner

*Primary Examiner* — Tuan Ho
*Assistant Examiner* — Marly Camargo
(74) *Attorney, Agent, or Firm* — Dennis L. Cook, Esq.

(57) ABSTRACT

This disclosure describes an apparatus and method of multi-spectral imaging to obtain and analyze information contained in the spectral distribution (reflection, absorption, or emission) of components within the image. The spectral information is captured in a series of images from differing spectral regions. This series of images are then combined into a composite image using re-colorization and image stabilization algorithms for display in real time. The process can be repeated continuously allowing spectral changes over time to be captured and analyzed. In the alternative one sequence of images can be captured for use as a still image.

3 Claims, 3 Drawing Sheets

MULTI-SPECTRAL CAMERA

CROSS-REFERENCE TO RELATED APPLICATION

The present application claims the benefit of previously filed Provisional Patent Application, Ser. No. 61/336,651 filed Jan. 25, 2010.

FIELD OF THE INVENTION

This invention belongs to the field of multi-spectral imaging optical devices. More specifically it is an apparatus and method of multi-spectral imaging to obtain and analyze information contained in the spectral distribution (reflection, absorption, or emission) of components within the image. The spectral information is captured in a series of images from differing spectral regions. This series of images are then combined into a composite image using re-colorization and image stabilization algorithms for display in real time. The process can be repeated continuously allowing spectral changes over time to be captured and analyzed. In the alternative one sequence of images can be captured for use as a still image.

BACKGROUND OF THE INVENTION

Multi-spectral imaging involves capturing images of a scene or object over multiple discrete wavelength bands and extracting spectral content from that data. By leveraging known spectral absorption or emission features to identify materials, the technique can be used for everything from mapping rock types in geological formations to identifying blood oxygenation or cancer cells. The problem is that multi-spectral imagers have historically been large, expensive, sophisticated airborne or satellite-mounted instruments. Because each scene is captured in three-dimensions (x, y, λ), the resultant data cubes can be gigabytes in size, while only a fraction of the data is useful. Even though multi-spectral imaging would be a beneficial tool for a range of low-cost, real-time, limited-wavelength applications like anticounterfeiting measures or medical diagnostics, the complexity of today's offerings makes it impossible. Multi-spectral imaging has been done by many methods including tunable Liquid Crystal and coated optical filters. In all methods a series of images of differing filtered spectral content are captured over time and then combined into a composite image using a separate computer for processing. This sequence of images is captured slowly and sequentially over time. Examples of prior art are disclosed in U.S. Pat. No. 5,943,129 issued to Hoyt, and U.S. publications 2009/0096895 by Benezra and 2009/0137908 by Patwardhan.

Typically a composite image is generated by various algorithms using spatial data from the sequence of captured images. Any spatial changes (movement) of an object between image captures will result in erroneous data in the composite image. Colors are assigned electronically to the resultant composite image in accordance with an algorithm generally specific to the particular application to enhance or highlight certain spectral information. The invention of this disclosure improves on the prior art by using real time, onboard processing and image stabilization. These improvements allow for simpler construction, lower cost components, and ease of customization for individual applications.

BRIEF SUMMARY OF THE INVENTION

The invention of this disclosure is an apparatus and method of multi-spectral imaging to obtain and analyze information contained in the spectral distribution (reflection, absorption, or emission) of components within the image. The spectral information is captured in a series of images from differing spectral regions. This series of images are then combined into a composite image using re-colorization and image stabilization algorithms for display in real time. The process can be repeated continuously allowing spectral changes over time to be captured and analyzed. In the alternative one sequence of images can be captured for use as a still image.

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

In general the preferred embodiment of the invention consists of a monochromatic 2D image sensor, optical filter wheel, motor, and electronics for image capture, synchronization, data analysis, and image output. The data capture parameters of each image can be customized to compensate for differences in spectral response and intensity reaching the sensor. Image stabilization algorithms are used to compensate for the spatial changes (motion) of objects within the captured images. The filters within the filter wheel allow selective spectral information to reach the sensor. In some applications each filter will be different and in other applications one or more filters will be the same. The sensor captures an image when a known filter is within the light path. This image will have a response proportional to the spectral transmission of the filter. This process is repeated with each successive filter. Once a sufficient quantity of images has been captured the resultant data is manipulated by an algorithm specific to the application and a composite image is generated. This composite image is then available to be displayed by an internal or external display device.

Figure 1A:
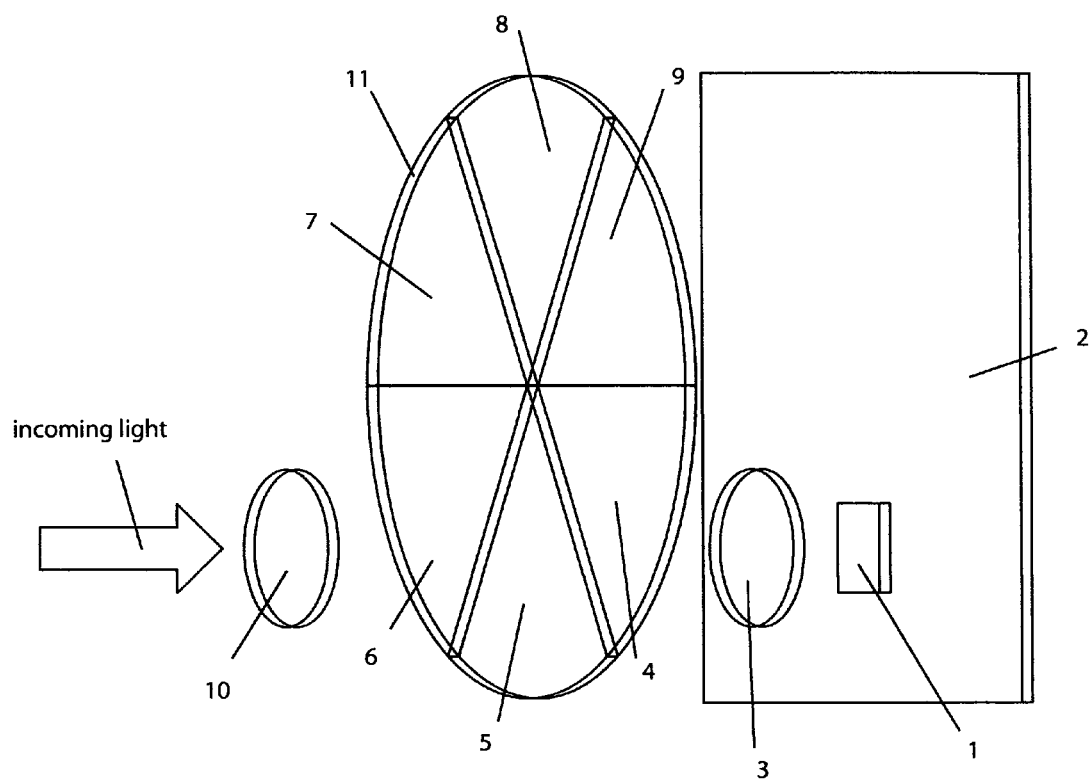
FIGS. 1(a) and 1(b) show exploded views of the device from a side and front perspective; and, FIG. 2 shows the device with differing locations of the filter wheel.
Figure 1:
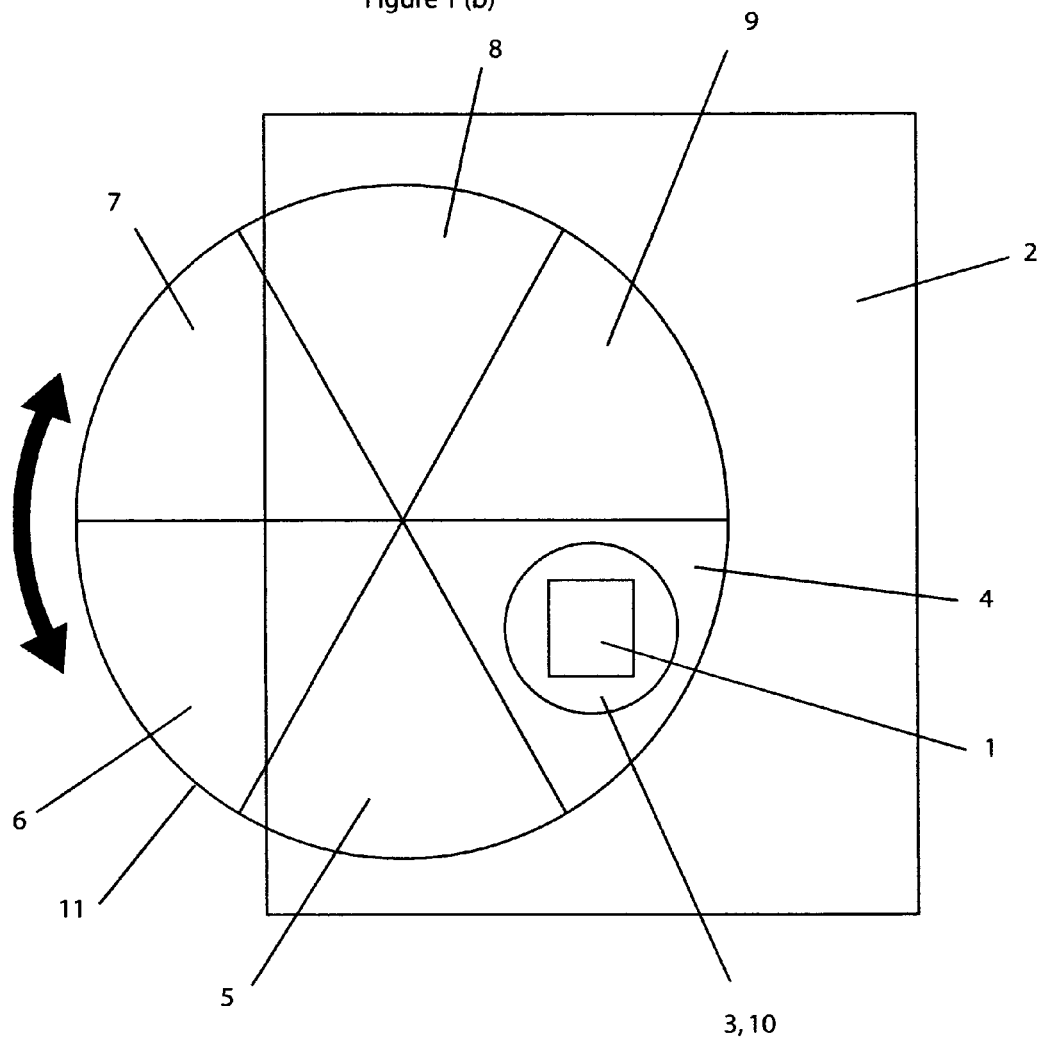
Figure 2:
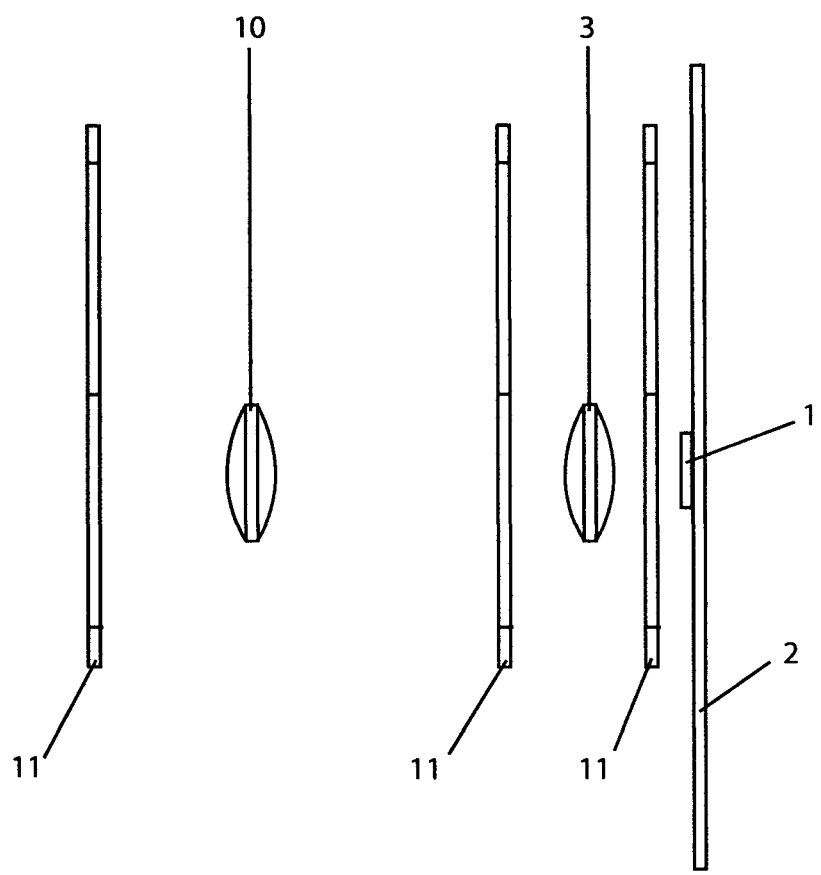

The assembly (FIG. 1) consists of a 2D image sensor array (1), electronics (2), filter wheel (11), and imaging lenses (3 and 10). The filter wheel (11) consists of multiple filter segments (4, 5, 6, 7, 8, or 9). The imaging lenses (3 and 10) or other method captures the incoming light and images it onto the sensor array (1). The filter wheel (11) is located such that the light reaching the image sensor array (1) passes through one or more filter segments (4, 5, 6, 7, 8, or 9). This location can be before, after, or within the imaging lenses (3 and 10) as shown in FIG. 3. There is no particular size or shape required of these filter segments (4, 5, 6, 7, 8, or 9). The spectral performance of each filter segment (4, 5, 6, 7, 8, or 9), along with the number of segments is determined by the requirements of the application and the image stabilization algorithms. Theoretically there is no limit to the number of filter segments (4, 5, 6, 7, 8, or 9).

In practice the filter wheel (11) is moved so different filter segments (4, 5, 6, 7, 8, or 9) pass through the light reaching the image sensor array (1). Various means of motion can be used and is not limited to motors, gears, belts, or human intervention. The filter wheel's (11) rotational position information is used by the electronics to determine which filter segment (4, 5, 6, 7, 8, or 9) is within the light path. At a predetermined time an image is captured and the data is then available for use by the composite image and image stabilization algorithm. When sufficient data has been collected a composite image is generated and can be displayed by an internal or external display device (2) such as an LCD or Plasma Display. Alternately the data from the composite image and each captured image is available for internal storage within the device or can be ported to an external device.

In the preferred embodiment the filter wheel (11) is rotating at a minimum of 100 RPM and each filter segment (4, 5, 6, 7, 8, or 9) is synced to a camera frame. Thus the RPM is a function of frame rate and number of filters. For example a 60 Hz frame rate and 4 filters results in greater than or equal to 900 RPM (60 Hz/4=15 Hz=>900 RPM). The constant angular velocity of the wheel minimizes momentum disturbances, jitter and power consumption and maximizes reliability, but the optical beam straddles two adjacent filters during each transition between them, hence the need to synchronize.

The filter segments (4, 5, 6, 7, 8, or 9) have a clear filter segment every $3^{rd}$ segment and the remaining filter segments (4, 5, 6, 7, 8, or 9) consisting of spectral filters depending on the application as is well known in the prior art. Every $3^{rd}$ rotation of the filter segments (4, 5, 6, 7, 8, or 9) creates a memory stack with the last two always stored in on-board memory of a camera (1) such as one using a CMOS imager like the Aptiva (Micron) MT9M002 or MT9M032. This series of stored images are then combined into a composite image using re-colorization and image stabilization algorithms such as the Finger Lakes Engineering FALCON Processor and Texas Instruments image stabilization module for the Davinci processor located in the on-board electronics (2) for display in real time. Other cameras and processors could be used as is well known by those skilled in the art. Thus, using the stabilization module, any spatial changes (movement) of an object between image captures will result in corrected data in the composite image. The process can be repeated continuously allowing spectral changes over time to be captured, analyzed, and displayed in real time on an integrated display.

The integration times and lighting can be adjusted during each filter period. The system also allows for real time mathematical manipulation and calculation of any individual or multiple images and an optimized optical system to ensure the same filter spectral performance across the scene, all without a connected computer. This results in a highly portable, even battery operated, multi-spectral imaging system.

Below is a short list of example uses for the disclosed multi-spectral imaging device:

Environmental: gas analysis, particulate/substance identification, pollution analysis, etc.

Safety: fire safety, dangerous material identification, drug detection, etc.

Medical: hemoglobin oxygenization, biological & pathogen identification, etc.

Since certain changes may be made in the above described multi-spectral imaging device without departing from the scope of the invention herein involved, it is intended that all matter contained in the description thereof or shown in the accompanying figures shall be interpreted as illustrative and not in a limiting sense.

What is claimed is:

1. A multi-spectral camera comprising;
   a monochromatic 2D image sensor array;
   a rotatable filter wheel;
   one or more imaging lenses;
   an image processor having a re-colorization algorithm and an image stabilization algorithm;
   said rotatable filter wheel comprising two or more different spectral filter segments and a clear filter segment after every two spectral filter segments;
   wherein said one or more imaging lenses captures incoming light and images the incoming light onto said monochromatic 2D image sensor array through said rotatable filter wheel such that the incoming light reaching said monochromatic 2D image sensor array passes through one of said two or more different spectral filter segments and said clear filter segment;
   said rotatable filter wheel position information being known by said image processor and said filter wheel rotating such that each of said two or more different spectral filter segments and said clear filter segment pass through the incoming light before reaching said monochromatic 2D image sensor array; and,
   wherein said filter wheel's position information is used to determine which of said two or more different spectral filter segments and said clear filter segment is within the incoming light path such that at a predetermined time an image is captured and data from said captured images of said two or more different spectral filter segments and said clear filter segment is then stored as an image stack such that when a current image stack and a image stack prior to said current image stack have been stored then in real time a composite image is generated by said image processor mathematically manipulating data from said current image stack and said prior image stack using said re-colorization and image stabilization algorithms and then displaying said generated composite image by a display device.

2. The multi-spectral camera of claim 1 wherein the data from the generated composite image and each captured image is stored for display on a display device.

3. The multi-spectral camera of claim 1 wherein the process of image capture and composite image generation is repeated continuously over a period of time allowing spectral changes to be captured and analyzed.

* * * * *